UNITED STATES PATENT OFFICE.

CARLETON B. HUTCHINS, OF DETROIT, MICHIGAN.

ROOFING COMPOUND.

SPECIFICATION forming part of Letters Patent No. 333,467, dated December 29, 1885.

Application filed September 21, 1885. Serial No. 177,635. (No specimens.)

*To all whom it may concern:*

Be it known that I, CARLETON B. HUTCHINS, a citizen of the United States, residing at Detroit, in the county of Wayne and State of Michigan, have invented a new and useful Improvement in Roofing Compounds, of which the following is a specification.

The object of my invention is to produce a durable, cheap, and efficient roofing compound, and more especially one adapted for the practical roofing of cars and such like roofs, which are subjected more or less to racking strains, that tend to crack the layer or coating of the roofing compound, and thus soon render the roof leaky and defective. With most roofing compounds heretofore in use this difficulty of the coating becoming hard and brittle and cracking is greatly aggravated in the winter season. As by my invention I utilize a waste material which to my knowledge has heretofore never been used for any purpose, and which may be procured at little or no cost, I overcome these and other difficulties in old roofing compounds and greatly increase the efficiency of the roofing compound, not only without adding to its cost, but, on the contrary, materially diminishing the cost of manufacture.

My improved roofing compound consists of pine tar, rosin, oil of rosin, oil of pine, and hair, or equivalent substances ordinarily used in roofing compounds, combined with a material which I have denominated "slickens," and which is a waste product from salt-factories. This material—slickens—is found as a deposit in the bottom of the salt-water tanks at salt-factories, the same being ordinarily precipitated from the salt-water in the tanks as brought from the springs or wells by sprinkling upon or adding to the salt-water a small quantity of lime. The lime, as I am informed, causes the slickens to be precipitated to the bottom, where it appears as a deposit of a bright green color. The slickens, however, upon being exposed to the atmosphere, changes from a green to a beautiful buff color. It is of about the consistency of very moist putty, and is of an oily and very sticky character. The slickens which I have heretofore used I have procured at the salt-works at Saginaw, Michigan. I have also caused it to be analyzed and have found its chemical composition to be about as follows: Common salt, about five parts, by weight; sulphate of magnesia, ten parts, by weight; Epsom salts, ten parts, by weight; carbonate of magnesia, twenty parts, by weight; oxide of iron, twenty parts, by weight; silica, fifteen parts, by weight; bromide of sodium, ten parts, by weight; mineral oil and water, ten parts, by weight.

The chemical composition of the slickens probably varies to some extent at different salt-springs, and I do not confine myself to any precise or particular chemical composition of the same, so long as it has the general characteristics or produces the same results in the combination with the other ingredients of my roofing compound.

To prepare my improved roofing compound I preferably take—say, for example, of tar, thirty gallons; melted rosin, six gallons; oil of pine, four gallons; oil of rosin, two gallons; slickens, twenty-eight gallons; cattle, hair, eight ounces, and thoroughly stir and mix the different ingredients together in a suitable kettle and boil the same for about three hours, care being taken not to burn or injure the materials by too great heat. The boiling should be continued until all the water or moisture is expelled from the different ingredients, and the stirring should also be continued at intervals, to prevent burning and to keep the ingredients thoroughly mixed. When the boiling has been completed, the compound will be ready for use or to be barreled for shipment.

The compound may be applied by a brush in the ordinary manner, it being of course first heated. The addition of the slickens acts as a filling to give the necessary body or substance to the compound, and at the same time renders the roofing soft and elastic, even in the coldest weather, and prevents its drying and becoming hard and brittle and thus cracking. The slickens also tends to render the compound fire-proof. If used simply as a filling to give the necessary body to the roofing compound, it is much superior to ground stone or other materials ordinarily used for that purpose, for the reason that owing to its thick, sticky, viscous, semi-fluid character, it does not have the tendency to settle and separate from the other ingredients of the compound like ground stone and like substances; but, on the contrary, it seems to have an affinity for the other ingredients, and forms therewith an homogenous compound throughout. The slickens being also a waste product, and requiring no previous labor or preparation, but simply to be mixed and boiled with the other ingredients, its addition not only greatly improves the compound, but also materially lessens its cost. I also find that by combining slickens with the other ingredients of a roofing compound, the water-proof qualities of the compound are improved, and that it is also rendered more durable.

I prefer to use all the ingredients and in about the proportions above indicated, as I find I thus produce the best roofing compound for most uses; but these proportions may be varied without departing from my invention.

In making roofing compounds for some uses ground stone may also be added.

The relative proportions of pine and rosin oil may be varied without to any appreciable extent affecting the efficiency of the compound. Sometimes I use equal quantities—three gallons of each—and sometimes I may use six gallons of one and none of the other.

The discovery which I have made and which I specially desire to claim herein is, that this waste material from salt-works—slickens—can be utilized as a valuable ingredient in roofing compounds, and I therefore do not limit myself to its combination with the particular roofing-compound ingredients above mentioned; and while I prefer to combine the slickens with the particular roofing-compound ingredients mentioned, other well-known roofing-compound ingredients commonly in use may, as equivalents or substitutes for those I have mentioned, be combined with the slickens.

I claim—

1. The improved roofing compound consisting in slickens or the above-described waste material from salt-works, combined with other roofing-compound ingredients, substantially as specified.

2. The roofing compound consisting of slickens or waste material from salt-works, tar, rosin, oil of rosin, oil of pine, and hair, combined substantially in the proportions described.

CARLETON B. HUTCHINS.

Witnesses:
 C. H. HUTCHINS,
 THOMAS HISLOP.